United States Patent [19]

Farrell et al.

[11] Patent Number: 4,626,456
[45] Date of Patent: Dec. 2, 1986

[54] LAMINATE STRUCTURE FOR COLLAPSIBLE DISPENSING CONTAINER

[75] Inventors: Christopher J. Farrell; Mark A. Williams, both of Arlington Heights, Ill.

[73] Assignee: American Can Company, Greenwich, Conn.

[21] Appl. No.: 728,789

[22] Filed: Apr. 30, 1985

Related U.S. Application Data

[63] Continuation of Ser. No. 565,522, Dec. 28, 1983, Pat. No. 4,526,823, which is a continuation of Ser. No. 341,610, Jan. 22, 1982, abandoned.

[51] Int. Cl.[4] .............................................. B32B 27/08
[52] U.S. Cl. ........................................ 428/35; 428/12; 428/167; 428/323; 428/324; 428/520; 524/425; 524/449; 524/439; 524/515; 222/107; 222/92
[58] Field of Search ............... 428/323, 324, 329, 516, 428/520, 35, 167, 12; 222/107, 92; 229/4.5; 220/15; 524/425, 449, 451, 515, 439

[56] References Cited

U.S. PATENT DOCUMENTS

| | | | |
|---|---|---|---|
| 3,154,461 | 10/1964 | Johnson | 428/323 |
| 3,861,529 | 1/1975 | Coleman | 428/35 |
| 3,946,905 | 3/1976 | Cogliano | 222/107 |
| 4,139,665 | 2/1979 | Herrero | 222/107 |
| 4,457,961 | 7/1984 | Nakazawa et al. | 428/35 |

FOREIGN PATENT DOCUMENTS

| | | | |
|---|---|---|---|
| 2419530 | 10/1974 | Fed. Rep. of Germany | 222/107 |
| 441596 | 11/1978 | Japan | 222/107 |
| 10258 | 3/1981 | Japan | 428/35 |

*Primary Examiner*—Edith Buffalow
*Attorney, Agent, or Firm*—Stuart S. Bowie; Douglas W. Wyatt

[57] ABSTRACT

A plastic laminate sheet for making collapsible dispensing container comprises an outer layer of filled-plastic made of polypropylene or a blend of polypropylene, and high density polyethylene, and a filler, preferably calcium carbonate, incorporated therein. The outer filled-plastic layer is coextensively bonded to an inner layer of high density polyethylene to form the laminate sheet. An intermediate layer of an oxygen barrier plastic may be interposed in the laminate sheet in order to impart oxygen impermeability thereto.

18 Claims, 4 Drawing Figures

LAMINATE STRUCTURE FOR COLLAPSIBLE DISPENSING CONTAINER

This is a continuation of application Ser. No. 565,522 filed Dec. 28, 1983 now U.S. Pat. No. 4,526,823, which is a continuation of Ser. No. 341,610, filed Jan. 22, 1982 now abandoned.

FIELD OF INVENTION

This invention relates generally to collapsible dispensing containers of laminated wall construction, and is particularly related to such containers in which the laminate structure does not include a metal foil. More specifically, the present invention is concerned with an all-plastic laminate structure for making collapsible dispensing containers or tubes of the type employed for packaging toothpaste, shaving cream, medicinal ointment, etc.

BACKGROUND OF INVENTION

Collapsible dispensing containers are widely used for packaging pharmaceutical products, dentifrice, cosmetics, toiletries and the like. In the past, such containers were made of plastic or metallic materials. However, as mentioned in U.S. Pat. No. 3,260,410 issued on July 12, 1966 to Brandt et al and U.S. Pat. No. 3,347,419 issued on Oct. 17, 1967 to Brandt et al, the plastic containers and the metallic containers which were used in the past had inherent drawbacks. For example, metal containers are costly to produce and often require a protective interior coating in order to protect the metal from attack by the acidic or alkaline contents of the containers. Plastic containers, on the other hand, are relatively inert but permeable, in varying degrees, to moisture, essential oils and other volatile ingredients. In addition, many of the plastics which are suitable for making the containers are permeable to oxygen.

In recent years, collapsible dispensing containers have been made of multiply plastic laminate structures which include an intermediate layer of a metal foil, e.g., aluminum foil. Typically as described in the aforementioned U.S. Pat. No. 3,347,419 of Brandt et al, such laminate structure have an inner layer of a thermoplastic material which forms the interior surface of the container. This inner layer is adhesively bonded to the foil layer by a suitable adhesive material that prevents delamination of the layers due to product attack. The outer surface of the foil layer is coated with a protective layer and a decorative layer is usually applied to the protective layer for aesthetic purposes.

The inclusion of a metal foil layer in the laminate structure used in making dispensing tubes or containers has several disadvantages. Metal foils are costly and more expensive than the plastic materials usually made in making such tubes. Their elimination or replacement with a less expensive substitute, therefore, decreases the cost per unit of container. In addition, and significantly, the inclusion of an intermediate layer of metal foil in the laminate structure complicates the manufacturing process, and slows down the rate of production of such tubes. Thus, and with the advent of high speed machinery and equipment for making collapsible dispensing containers, the elimination of the metal foil layer, or its substitution by a suitable plastic layer, permits construction of the containers more rapidly and at lower cost.

While an all-plastic laminate structure offers cost advantage and is less complicated to fabricate into collapsible tubes than metal foil-containing laminates, not all of the plastic materials have been found to be well suited for making such tubes. The reason is that while metal foil-containing laminate structures exhibit good crease-retention properties, most plastic materials used for making collapsible dispensing tubes exhibit poor crease-retention. This crease-retention ability or so-called "dead fold" property of the laminate structure is a significant consideration.

Accordingly, it is an object of the present invention to provide a laminate structure for making collapsible containers, wherein the laminate structure does not include a metal foil layer.

It is a further object of this invention to provide an all-plastic laminate structure for collapsible dispensing tubes wherein the laminate structure exhibits satisfactory and acceptable crease-retention and dead fold characteristics.

It is also an object of this invention to provide an all laminate structure which permits the dispensing containers to be made at higher rates and less expensively than metal foil-containing laminate structure.

The foregoing and other objects and advantages of the present invention will become more apparent from the following detailed description and the accompanying drawings.

SUMMARY OF INVENTION

In accordance with the present invention, a laminate sheet is provided for use in making a collapsible dispensing container which does not employ a metal foil in the laminate structure. The laminate sheet has an outer layer, of polypropylene, or a blend of polypropylene and high density polyethylene, filled with a filler, e.g., calcium carbonate, mica or talc, and is coextensively bonded to an inner layer of high density polyethylene.

In order to impart oxygen impermeability to the laminate sheet, an oxygen barrier layer, e.g., polyester, ethylene-vinyl alcohol copolymer, ethylene-vinyl acetate copolymer, polyacrylonitrile, saran, nylon, etc. is interposed between the outer and inner layers and a suitable adhesive layer is used to bond the oxygen barrier layer to the outer layer and inner layer, respectively.

The laminate sheets described herein have good "dead fold" properties and crease retention comparable to metal foil-containing laminates and may be used to form collapsible dispensing containers more economically and at higher production rates than heretofore possible with metal foil-containing laminates.

Furthermore, improvement in dead fold characteristic of the laminate sheet is realized by providing an outer grooved surface in the outer filled-plastic layer.

BRIEF DESCRIPTION OF THE DRAWINGS

In the drawings wherein like reference numerals designate like layers.

Figure 1:
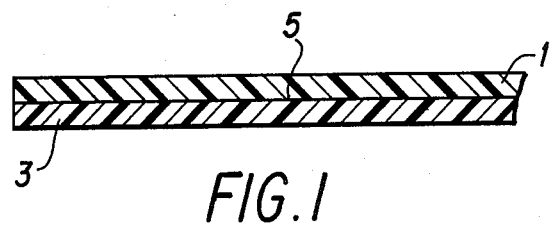
FIG. 1 is a sectional view of a laminated sheet made of two plastic layers in accordance with the present invention.

The several layers in the drawings are not drawn to scale and are shown in exaggerated dimensions to facilitate their illustrations.

DETAILED DESCRIPTION OF THE DIFFERENT EMBODIMENTS OF THE INVENTION

It has now been discovered that an all plastic laminate sheet may be used more advantageously in lieu of metal foil-containing laminates to form collapsible dispensing containers. Thus, referring first to FIGS. 1–3, there is shown a laminate sheet made of two plastic layers, i.e., an outer plastic layer 1 and an inner plastic layer 3 which are melt pressed and bonded to each other along their respective opposing surfaces as at 5. As it was previously mentioned, not all plastic materials can be used indiscriminately to form the laminate sheets which are suitable for the purpose of this invention. Several factors must be taken into consideration in selecting the appropriate plastic material for each layer of the laminate sheet.

Thus, the outer layer must have good crease-retention property and low yield elongation; it must not crack when folding the laminate sheet and must have good adhesion to the bottom layer so that the two layers can be melt pressed to form the laminated structure without subsequent delamination.

The inner layer, on the other hand, must act as a support for the outer layer; serve to transfer outward any strain produced in the laminated sheet upon folding, and must also be capable of adhesion to the outer layer by melt pressing.

Suitable materials for the outer layer of the laminate sheet in accordance with this invention depends on whether a seamless tube or a tube having a lap seam is used in making the container. If the container tube is seamless, filled polypropylene is the material of choice. On the other hand, if the tube has a lap seam, a filled blend of polypropylene and high density polyethylene is the preferred material. In both instances, the plastic material includes a filler such as calcium carbonate ($CaCO_3$), talc, mica, glass powder, metal powder, or mixtures thereof.

The filler is preferably surface treated in order to enhance its dispersion in the filled plastic and to obtain superior yield strain properties.

Whether polypropylene is used alone or is blended with high density polyethylene, it is preferable to use isotactic polypropylene rather than the atactic form. Also, impact grade polypropylene may be satisfactorily employed as the outer plastic material. Impact grade polypropylene usually contains a small amount of another comonomer copolymerized therewith. Such impact grade polypropylenes are available from several sources including Shell Oil Company and Hercules Powder Company.

As it was previously mentioned, the outer plastic layer has a filler incorporated therein. The amount of the filler varies from about 5 to about 80 percent by weight, preferably from about 55 to about 80 percent by weight, and most preferably from about 55 to about 65 percent by weight of the filled plastic. The filler and the plastic material may be blended in different types of blenders such as, for example, an internal mixer, a two roll mill and a twin screw extruder.

The plastic of choice for the inner layer of the laminate sheet is high density polyethylene. Unlike the outer layer, however, the inner plastic layer does not contain a filler.

The average particle size of the filler may vary over a relatively wide range of from about 1 to about 100 microns, preferably from about 1 to about 10 microns. In most practical applications, the average particle sizes vary over a relatively narrow range of, say, from about 2 to about 4 microns to achieve better uniformity in the filled plastic.

The incorporation of a filler in the plastic material to produce a plastic-filled polymer lowers the yield strain level of the outer layer. For example, when using polypropylene and $CaCO_3$ to form the plastic-filled layer, the yield strain level of the outer layer was slightly below 2% as compared with a yield strain of about 15% for polypropylene alone. This reduction in yield strain level is a significant consideration in selecting filled plastics for forming the outer layer of the laminate sheets of the present invention.

Figure 3:
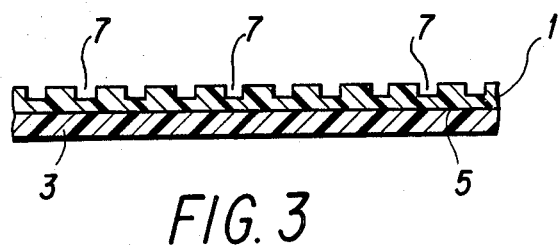
FIG. 3 is a sectional view similar to FIG. 1 wherein the outer surface is grooved for further enhancement of dead fold properties of the laminate sheet.

According to one embodiment of the invention, the yield strain elongation of the outer layer 1 may be further enhanced by providing this layer with grooved surface as shown in FIG. 3. Thus, a plurality of substantially equally spaced grooves 7 may be formed on the surface of the outer layer by, for example, pressing on a grooved plate. These grooves may be formed in the outer layer prior to melt pressing the two layers together or it may be formed after the laminate sheet has been made.

Figure 4:
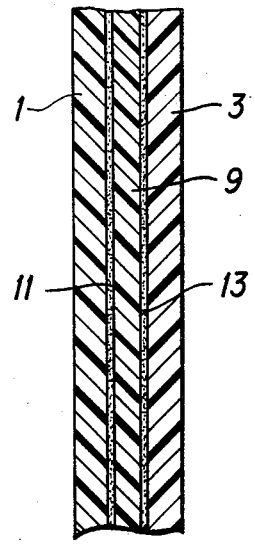
FIG. 4 is a sectional view of another embodiment of the invention illustrating a multiply laminate including an oxygen barrier layer.

In general, the deeper and narrower the grooves, the more concentrated the strain and the lower the yield strain elongation in the outer layer, and hence, in the laminate sheet.

Where oxygen impermeability is required, the laminate sheet must include an oxygen barrier layer as shown in FIG. 4, which illustrates a further embodiment of the invention. Thus referring to FIG. 4, the laminate sheet shown therein has an outer layer and an inner layer 3 which are the same layers described in connection with the description of FIGS. 1–3. As in FIG. 3, the outer layer 1 may be grooved in a similar manner as hereinbefore described.

The laminate sheet shown in FIG. 4 includes an oxygen impermeable layer 9 which is selected from plastic materials with known oxygen impermeability. Such plastic materials include polyester, ethylene-vinyl alcohol copolymers, ethylene-vinyl acetate copolymers, polyacrylonitrile, saran, nylon, etc. Ethylene-vinyl alcohol copolymers are the preferred plastic materials for use as oxygen barrier.

Further referring to FIG. 4, the oxygen barrier layer 9 is coextensively bonded to the outer layer 1 by an adhesive layer 11 and to the inner layer 3 by an adhesive layer 13. These adhesive layers are well known in making laminate sheets and they include copolymers of olefin and an acid of the group consisting of acrylic and alkacrylic acid, and copolymers of ethylene and vinyl ester. Specifically, recommended adhesive materials are ethylene-acrylic acid copolymers and ethylene-vinyl acetate copolymers.

Also, while in the embodiment shown in FIG. 4 the barrier layer is interposed between the outer and inner layers, the barrier layer may, if desired, be the outermost or the innermost layer of the laminate sheet.

Figure 2:
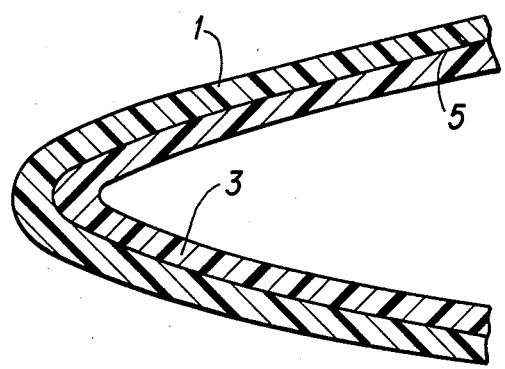
FIG. 2 is a sectional view of a rolled up laminated sheet having the same two layers as in FIG. 1.

Whether forming the laminate sheet described in connection with the embodiments in FIGS. 1–3, or the embodiment shown in FIG. 4, the thickness of each layer is not per se critical. Typically, however, the thickness of the outer layer is from about 3 to about 7 mils and the thickness of the inner layer is also from about 3 to about 7 mils.

A laminate sheet formed in accordance with this invention is useful in making collapsible dispensing containers, in accordance with well known methods as described in the aforementioned patents of Brandt et al as well as other prior art patents including U.S. Pat. Nos. 3,260,777 and 3,295,725, both issued to Roger Brandt. The disclosure of the aforementioned patents are, accordingly, fully incorporated herein by reference.

The following examples will serve to illustrate the present invention. It must be understood, however, that these examples are merely illustrative and are not intended to limit the scope of the invention.

EXAMPLE I

A laminate sheet was made in which the outer layer was polypropylene (Exxon E 612) containing 60 percent by weight of calcium carbonate (Pfizer Hi-Pflex). The inner layer of the laminate was high density polyethylene (Chemplex 6001).

The outer layer and the inner layer was each 5 mils thick, and were melt pressed to form the laminated structure. This laminated sheet showed poor adhesion between the two layers, indicating that it is not suitable for making tubes having a lap seam due to poor adhesion between polypropylene and polyethylene. However, such laminated sheets are useful for making seamless tubes.

EXAMPLE II

The outer layer in this example was 4 mils thick and was made of 20% polypropylene (Exxon E 612), 20% high density polyethylene (Chemplex 6001) and 60% calcium carbonate. All percentages are on weight basis.

The inner layer was high density polyethylene (Chemplex 6001) and was 5 mils in thickness.

The resulting laminated structure had a deadfold angle of 32° and is particularly useful in making lap seam tubes because of good adhesion in between the two layers.

The deadfold angle is measured by folding a strip of the laminate sheet back on itself and then releasing it until it comes to equilibrium. The angle between the two parts of the strip is referred to as the deadfold angle.

In general, low angles are indicative of good deadfold properties and laminate sheets having low deadfold angles of about 13° to about 35° exhibit satisfactory crease-retention properties.

EXAMPLES III-V

Several laminate sheets were made as in Example I except for the materials of the outer layer. Otherwise, the laminates were the same in all other respects. The results are shown in the following table.

TABLE

| Example | Polymer | Source | Melt Index |
| --- | --- | --- | --- |
| III | isotactic polypropylene | Hercules 6823 | 0.4 |
| IV | isotactic polypropylene | Exxon 5052 | 1.2 |
| V | high impact polypropylene* | Shell 7328 | 2.0 |

*contains small amount of copolymerized comonomer

The laminate sheets had deadfold angles varying from 26° to 33° indicating good crease-retention properties.

What is claimed is:

1. A crease-retaining plastic laminate sheet useful for making collapsible dispensing container, said laminate sheet comprising an outer layer of a filled plastic material coextensively bonded to an inner plastic layer, wherein said filled plastic material comprises a polymer selected from the group consisting of polypropylene, high impact grade polypropylene and a blend of polypropylene or high impact grade polypropylene with high density polyethylene, and from about 5 to about 80 percent by weight, based on said filled plastic material, of a filler selected from the group consisting of calcium carbonate, talc, mica, glass powder, metal powder and mixtures thereof, and wherein said inner plastic layer is made essentially of high density polyethylene.

2. A plastic laminate sheet as in claim 1 wherein the polymer of said outer layer is polypropylene.

3. A plastic laminate sheet as in claim 1 wherein the polymer of said outer layer is high impact grade polypropylene.

4. A plastic laminate sheet as in claim 1 wherein the polymer of said outer layer is a blend of polypropylene and high density polyethylene.

5. A plastic laminate sheet as in claim 1 wherein the polymer of said outer layer is a blend of high impact grade polypropylene and high density polyethylene.

6. A plastic laminate sheet as in claims 1, 2, 3, 4 or 5 wherein said outer layer has a grooved outer surface.

7. A plastic laminate sheet as in claims 1, 2, 3, 4 or 5 wherein said filler is calcium carbonate.

8. A plastic laminate sheet as in claim 6 wherein said filler is calcium carbonate.

9. A crease-retaining plastic laminate sheet useful for making collapsible dispensing container, said laminate sheet comprising outer layer of a filled plastic material, an intermediate layer of oxygen-impermeable material, a first adhesive layer for coextensively bonding said outer layer to said intermediate layer and a second adhesive layer for coextensively bonding said inner layer to said intermediate layer, wherein said filled plastic material comprises a polymer selected from the group consisting of polypropylene, high impact grade polypropylene and a blend of polypropylene or high impact grade polypropylene with high density polyethylene, and from about 5 to 80 percent by weight, based on said filled plastic material, of a filler selected from the group consisting of calcium carbonate, talc, mica, glass powder, metal powder and mixtures thereof, and wherein said inner plastic layer is made essentially of high density polyethylene.

10. A plastic laminate sheet as in claim 9 wherein the polymer of said outer layer is polypropylene.

11. A plastic laminate sheet as in claim 9 wherein the polymer of said outer layer is high impact grade polypropylene.

12. A plastic laminate sheet as in claim 9 wherein the polymer of said outer layer is a blend of polypropylene and high density polyethylene.

13. A plastic laminate sheet as in claim 9 wherein the polymer of said outer layer is a blend of high impact grade polypropylene and high density polyethylene.

14. A plastic laminate sheet as in claims 9, 10, 11, 12 or 13, wherein said outer layer has a grooved outer surface.

15. A plastic laminate sheet as in claims 9, 10, 11, 12 or 13 wherein said filler is calcium carbonate.

16. A plastic laminate sheet as in claim 14 wherein said filler is calcium carbonate.

17. A plastic laminate sheet as in claims 1, 2, 3, 4 or 5 wherein the laminate sheet further comprises an oxygen barrier layer coextensively bonded to the outer surface of said outer layer.

18. A plastic laminate sheet as in claims 1, 2, 3, 4 or 5 wherein the laminate sheet further comprises an oxygen barrier layer coextensively bonded to the inner surface of said inner layer.

* * * * *